United States Patent [19]

Cuisia et al.

[11] Patent Number: 4,600,524
[45] Date of Patent: Jul. 15, 1986

[54] COMPOSITION AND METHOD FOR INHIBITING SCALE

[75] Inventors: Dionisio G. Cuisia, Chicago; Chih M. Hwa, Palantine, both of Ill.

[73] Assignee: W. R. Grace & Co., New York, N.Y.

[21] Appl. No.: 559,517

[22] Filed: Dec. 8, 1983

[51] Int. Cl.$^4$ ................................................ C02F 5/14
[52] U.S. Cl. ...................... 252/181; 252/80; 252/86; 252/174.24; 252/180; 252/DIG. 2
[58] Field of Search .............. 252/180, 86, 80, 174.24, 252/DIG. 2, 181

[56] References Cited

U.S. PATENT DOCUMENTS

| | | | |
|---|---|---|---|
| 3,308,067 | 3/1967 | Diehl | 252/545 |
| 3,629,121 | 12/1971 | Eldib | 252/135 |
| 3,706,717 | 12/1972 | Siegele | 260/78.5 |
| 3,756,966 | 9/1973 | Lamberti | 252/538 |
| 3,879,288 | 4/1975 | Siegele | 210/58 |
| 4,118,318 | 10/1978 | Welder et al. | 252/175 |
| 4,166,041 | 8/1979 | Goodman | 252/180 |
| 4,209,398 | 6/1980 | Ii et al. | 252/181 |
| 4,255,259 | 3/1981 | Hwa et al. | 210/699 |
| 4,306,991 | 12/1981 | Hwa et al. | 252/180 |
| 4,342,652 | 8/1982 | Schiller et al. | 210/698 |
| 4,351,796 | 9/1982 | Marshall | 422/15 |
| 4,442,009 | 4/1984 | O'Leary et al. | 210/697 |
| 4,581,145 | 4/1986 | Cuisia et al. | 210/699 |

FOREIGN PATENT DOCUMENTS

| | | |
|---|---|---|
| 0122013 | 10/1984 | European Pat. Off. |
| 1233259 | 5/1971 | United Kingdom |
| 1463173 | 2/1977 | United Kingdom |
| 1539974 | 2/1979 | United Kingdom |
| 1575173 | 9/1980 | United Kingdom |
| 1581968 | 12/1980 | United Kingdom |
| 1589109 | 5/1981 | United Kingdom |
| 2061249 | 5/1981 | United Kingdom |
| 2105319 | 3/1983 | United Kingdom |

*Primary Examiner*—Paul Lieberman
*Assistant Examiner*—Robert A. Wax
*Attorney, Agent, or Firm*—David E. Heiser; W. W. McDowell, Jr.

[57] ABSTRACT

The accumulation of scale in an aqueous system is inhibited by the addition of a copolymer of maleic acid or anhydride or fumaric acid and allyl sulfonic acid and a water soluble organic phosphonic acid such as aminotri(methylene phosphonic acid), ethylenediaminetetra(methylene phosphonic acid), hydroxyethylidene diphosphonic acid and 2-phosphonobutane tricarboxylic acid-1,2,4 or water soluble salts thereof. Scale can actually be removed by the addition of these materials to pressurized boiler water systems. Allyl or vinyl copolymers, a phosphonate, and optionally a water soluble, hardness precipitating agent such as a carbonate or a phosphate may be used when treating pressurized boilers to provide an in-service cleaning effect.

6 Claims, No Drawings

COMPOSITION AND METHOD FOR INHIBITING SCALE

This invention relates to the treament of aqueous systems and, more particularly, to the inhibition and removal of solid deposits in industrial heating and cooling systems.

The water used in steam generating boilers, cooling towers, desalination units and other industrial aqueous systems contains various impurities. The impurities typically include alkaline earth cations such as calcium, barium, and magnesium and several anions such as bicarbonate, carbonate, sulfate, oxalate, phosphate, silicate, and fluoride. These anions and cations combine and form precipitates due to the pH, pressure, or temperature in the system or the presence of additional ions with which they form insoluble products. The most common impurities in industiral water supplies are the water hardening calcium, magnesium and carbonate ions. In addition to precipitating as carbonates, calcium and magnesium as well as any iron or copper present can also react with phosphate, sulfate, and silicate ions and form the respective complex insoluble salts. These solid reaction products accumulate on surfaces of the system and form scale. The water may also contain various solids such as mud, clay, iron oxides, silt, sand, and other mineral matter and miicrobiological debris that accumulate as sludge deposits in the system. Iron oxides may be present in the feedwater and may be produced by corrosion of metal surfaces in contact with the water. The sludge may become incorporated in the scale deposits and the precipitates tend to cement the sludge particles and form a strongly adherent scale.

Sludge and scale deposits greatly reduce heat transfer efficiency by settling at low flow points in the system and limiting the circulation of the water and insulating it from the heat transfer surfaces. In addition to interfering with heat transfer and fluid flow, corrosion of metal surfaces underneath the deposits is facilitated since corrosion control agents are unable to contact the surfaces effectively. The deposits also harbor bacteria. Removal of the deposits can cause expense delays and shutdown of the system. Water at the relatively high temperatures in steam generating boilers and hard waters are especially susceptible to scale formation. Extremely severe scale deposits can cause localized overheating and rupture in boilers.

Since external treatments such as softening, coagulation, and filtration do not adequately remove solids and solid-forming substances, various internal chemical treatments have been used to prevent and remove scale and sludge in aqueous systems. The chemical treatment for boilers generally involves the combined use of a precipitating agent and a solid conditioner to maintain the solids in the boiler water in a suspended state. The precipitating chemicals commonly employed for calcium salts are soda ash and sodium phosphates. Magnesium is precipitated by gthe alkalinity of boiler water as magnesium hydroxide. The precipitate or sludge is periodically removed with the water drained from the boiler by blowdown. In blowdown, the sludge-containing boiler water is removed through a valve by rapidly reducing the pressure within the boiler.

A variety of polycarboxylate and other soluble, polar polymers such as acrylate and methacrylate polymers have been used as solid conditioners in industrial water systems. The presence of small quantities of these polymers improves the fluidity of sludge and results in the formation of amorphous, frangible and serrated precipitates instead of hard, dense crystals that form scale on surfaces.

Phosphonates are used extensively in water treatment as precipitation inhibitors and are effective in threshold amounts that are markedly lower than the stoichiometric amount required for chelating or sequestering the scale forming cation.

U.S. Pat. Nos. 3,706,717 and 3,879,288 of Siegele disclose that scale deposits can be controlled or prevented in aqueous systems by the addition of an aliphatic copolymer of a monovinyl compound and a vinyl sulfonate. The copolymer contains from about 25 mole percent to 75 mole percent of the sulfonate and has a molecular weight of about 1,000 to 25,000. The copolymer preferably contains about 50 mole percent of the sulfonate and has a molecular weight of about 10,000. The monovinyl compound is propylene, acrylamide, acrylonitrile, acrylic acid methylacrylate, isobutene, methacrylamide, methacrylonitrile, methyl methacrylate, methacrylic acid, 2 carbomethoxy propenoic acid, fumaric acid, or maleic acid. The vinyl sulfonates include vinyl sulfonic acid and allyl sulfonic acid. Siegele discloses that the copolymer is useful in evaporators, cooling towers, heat exchangers, boilers, and other aqueous systems and may be used with corrosion inhibitors, other sequestrants, and chelating agents. The effectiveness of the copolymer in retarding scale formation is compared to that of hydroxyethylidene 1,1 diphosphonic acid in Example 3 of both patents.

U.S. Pat. No. 4,342,652 of Schiller and Balcerski discloses that the addition to water of a copolymer of maleic acid or anhydride and allyl sulfonic acid provides increased inhibition of scale formation in evaporative desalination units. The copolymer is derived from about 25 to about 90 mole percent of maleic acid or anhydride and has a molecular weight in the range of about 500 to about 25,000. Preferably, the mole percent of maleic acid is about 40 to 60 percent and the molecular weight is from about 5,000 to 10,000.

The scale inhibitor for heat exchangers, cooling towers and other aqueous systems of British Patent Publication 2 061 249 of Greaves and Ingham comprises a water soluble phosphonate and a vinyl addition type copolymer or water soluble salts thereof. The phosphonates contain at least one carboxylic acid group and at least one phosphonic acid group and have at least three acid groups attached to the carbon atom. The copolymers are generally derived from ethylenically unsaturated acids such as maleic acid (or anhydride), acrylic acid, and methacrylic acid and possess carboxylic or carboxylic anhydride groups and sulfonate groups. A particularly preferred phosphonate is 2-phosphonobutane-1,2,4-tricarboxylic acid. Preferred copolymers include a copolymer of methacrylic acid and 2-acrylamido-2-methylpropane sulfonic acid and a copolymer of styrene sulphonic acid and maleic acid. When $R_2$ is hydrogen and Y is a sulfonic acid radical in the disclosed formula for the sulfonate-containing unit of the copolymer and the ethylenically unsaturated unit is maleic anhydride, the copolymer is a copolymer of vinyl sulfonic acid and maleic anhydride. In the examples, it is demonstrated that combinations of a copolymer of methacrylic acid and 2-acrylamido-2-methyl propane sulfonic acid and the phosphonobutane carboxylic acids have a synergistic effect and that combinations of the polymer with other phosphonates including nitrilotrismethylene phosphonic acid, hydroxyethylidene diphosphonic acid, and hexamethylene diamine tetramethylene phosphonic acid, do not.

U.S. Pat. Nos. 4,255,259 and 4,306,991 of Hwa and Cuisia disclose a composition for inhibiting scale in aqueous systems, particularly steam generating boilers. The composition comprises a copolymer of styrene sulfonic acid and maleic anhydride or maleic acid and a water soluble phosphonic acid or salts thereof. Various phosphonic acids including hydroxyethylidene diphosphonic acid, nitrilotri(methylene phosphonic acid), and ethylenediaminetetra(methylene phosphonic acid) may be used.

The composition for inhibiting formation of scale in an aqueous system of the present invention comprises scale inhibiting amounts of a copolymer which possesses recurring units of the formula:

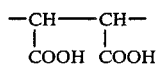

and of the formula

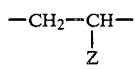

where Z represents —CH$_2$SO$_3$H or a water soluble salt thereof and a water soluble organic phosphonic acid or a water soluble salt thereof. The method of inhibiting the formation of scale in an aqueous system of the present invention comprises adding to the system scale inhibiting amounts of the copolymer and the phosphonic acid.

The present invention provides unexpectedly superior inhibition of deposition and formation of scale, particularly those containing calcium and magnesium phosphates and silicates and iron oxide, on metallic surfaces of industrial water systems. The composition and method are effective when used at low treatment levels and in water at high temperatures and pressures in steam generating boilers and in water of high hardness and alkalinity. Indeed, the present invention also provides the surprising additional advantage that, in pressurized boiler systems (which normally operate at an alkaline pH, generally from 9.5 to 12), an in-service cleaning effect can be obtained. In other words, the invention provides a method of removing scale from a scaled pressurized boiler. Further, it has been found that the combination of the phosphonate and a copolymer having the recurring units specified above but with Z being —SO$_3$H, i.e., units derived from vinyl rather than allyl sulfonic acid also provides this in-service cleaning effect in pressurized boilers and this forms another aspect of the present invention. It will be appreciated that by "pressurized boilers" we mean boilers operating at a pressure of at least 50 psig, generally at least 80 psig, typically 80 to 150 psig, (low pressure), generally 150 to 600 psig (moderate pressure) and above 600 and up to, say, 2000 psig (high pressure). In such boilers, the water will be at its boiling point which will vary from about 298° F. at 50 psig, to about 324° F. at 80 psig, to about 366° F. at 150 psig, to about 489° F. at 600 psig, and to about 637° F. at 2000 psig.

The present invention employs one or more water soluble organic phosphonic acids or water soluble salts thereof. The preferred organic phosphonic acids are alkylene phosphonic acids and phosphonocarboxylic acids. Suitable phosphonic acids have the general formula:

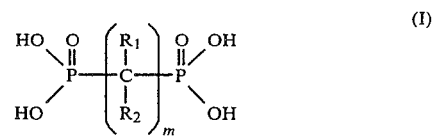

wherein m is an integer from 1 to 10, R$_1$ is hydrogen or an alkyl group having from 1 to 4 carbon atoms, R$_2$ is hydroxyl, hydrogen, or an alkyl group having from 1 to 4 carbon atoms; or the general formula:

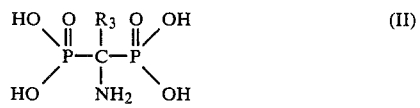

wherein R$_3$ is an alkyl group having 1 to 10 carbon atoms, benzyl, or phenyl; or the general formula:

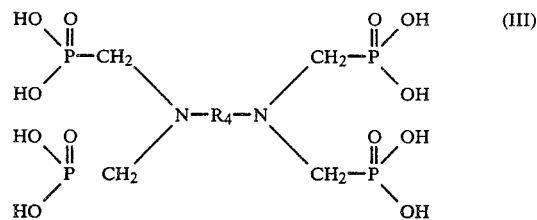

wherein R$_4$ is an alkylene group having from 1 to 10 carbon atoms; or the general formula:

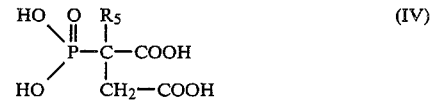

wherein R$_5$ is hydrogen, alkyl, alkenyl or alkynyl having up to 4 carbon atoms; phenyl; cycloalkyl having 3 to 6 carbon atoms; benzyl; phenethyl or

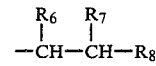

wherein R$_6$ is hydrogen, alkyl having 1 to 4 carbon atoms or carboxyl, R$_7$ is hydrogen or methyl and R$_8$ is a carboxyl or phosphonate.

Water soluble amino alkylene phosphonic acids, hydroxy alkylidene phosphonic acids, phosphonocarboxylic acids, or water soluble salts thereof are especially preferred. The most preferred compounds are aminotri(methylene phosphonic acid), ethylenediaminetetra(methylene phosphonic acid), hydroxyethylidene-1,1-diphosphonic acid, 2-phosphonobutane tricarboxylic acid-1,2,4 and water soluble salts thereof. The hydroxy alkylidene diphosphonic acid is commercially available and conventional procedures for the preparation of this and other such phosphonic acids are described, for example, in U.S. Pat. Nos. 3,214,454 and 3,297,578. The most preferred aminophosphonic acid is commercially available and the preparation of this and other such phosphonic acids by conventional procedures is described for example, in U.S. Pat. Nos. 3,234,124 and 3,298,956. 2-phosphonobutane tricarboxylic acid-1,2,4 is commercially available and these and other such phosphonocarboxylic acids can be prepared by conventional procedures such as those describedd, for example, in U.S. Pat. No. 4,020,101 of Geffers et al. Other suitable phosphonic acids having these formulas include, for example, diethylenetriamine penta(mmethylene phosphonic acid), triethylenetetraamine hexa(methylene phosphonic acid), hexamethylenediamine tetra(methylene phosphonic acid), aminoethylidene diphosphonic acid, aminopropylidene, diphosphonic acid, hydroxypropylidene diphosphonic acid, hydroxybutylidene diphosphonic acid, hydroxyhexylidene diphosphonic acid, 1-phosphonoethane-1,2-dicarboxylic acid and 2-phosphonobutane-1,2,3,4-tetracarboxylic acid.

The composition of the present invention further comprises an aliphatic copolymer of maleic acid or anhydride or fumaric acid and allyl sulfonic acid or a water soluble salt thereof. The copolymer may be prepared by copolymerizing maleic acid or anhydride or fumaric acid with allyl sulfonic acid or an alkali metal salt thereof by following conventional procedures such as those described in U.S. Pat. Nos. 3,706,717 and 3,879,288 of Siegele. Conventional additional polymerization methods in the presence of light or free radical initiators may be employed. Generally, the copolymerization may be effected at from about 30° to about 120° C. using a peroxide in an inert medium. The copolymer may be derived, for example, by solution polymerization of maleic acid and sodium allyl sulfonate in the presence of hydrogen peroxide. The corresponding vinyl copolymers for use in the pressurised boiler treatment method of the present invention may be prepared in a similar manner from maleic acid or anhydride or fumaric acid and vinyl sulfonic acid or a water soluble salt thereof.

The relative proportions of sulfonate and carboxylate depend upon the degree of scale inhibition needed. The copolymer generally contains from about 10 to about 80 mole percent of sulfonate moieties and correspondingly from about 90 to about 20 mole percent of the carboxylate moieties. Preferably, the sulfonate moieties comprise about 25 to about 75 mole percent of the copolymer and the carboxylate moieties comprise from about 75 to about 25 mole percent. For the vinyl sulfonate copolymers, the sulfonate moieties especially comprise about 50 to 75 mole percent of the copolymer and the carboxylate moieties from about 50 to about 25 mole percent.

The average molecular weight of the copolymer is not critical so long as the polymer is water soluble. Generally, the weight average molecular weight ranges from about 500 to about 100,000. The molecular weight is preferably from about 800 to about 25,000 and especially is from about 1,000 to about 15,000. A copolymer having a mole ratio of maleic acid or anhydride to allyl sulfonic acid of about 1:1 and a molecular weight of about 2,000 is especially preferred. Preferred vinyl sulfonate copolymers include those having a weight ratio of maleic acid or anhydride to vinyl sulfonic acid of about 1:1.5 or about 1:3 and a molecular weight of about 7,000 to about 9,000. Although the best results are generally obtained with the 1:3 mole ratio, in practice because of the relatively high cost of the vinyl sulfonic acid, a mole ratio of 1:1.5 is generally preferred even though the results are not quite so good.

The phosphonic acids and the copolymers are generally used in the formof an alkali metal salt and usually as the sodium salt. Other suitable water soluble salts include potassium, ammonium, zinc, and lower amine salts. The free acids may also be used and all of the acidic hydrogens need not be replaced nor need the cation be same for those replaced. Thus, the cation may be any one of or a mixture of $NH_4$, H, Na, K, etc. The copolymer is converted into the water soluble salts by conventional methods.

While it is possible to add the phosphonic acid and the copolymer separatedly to an aqueous system, it is generally more convenient to add them together in the form of a composition. The composition of the present invention generally comprises from about 0.1 to about 100, preferably about 2 to 6, parts by weight of the copolymer and from about 0.1 to about 100, preferably about 0.5 to and from about 0.1 to about 100, preferably about 0.5 to 5, parts by weight of the phosphonic acid. Generally, the polymer and phosphonic acid are present in the composition in a weight ratio of about from 10:1 to about 1:10, preferably of from about 4:1 to about 1:4, and especially of about 1:1.

The compositions may be added as dry powders and permitted to dissolve during use but normally are used in the form of aqueous solutions. The solutions generally contain from about 0.1 to about 70 weight percent of the composition and preferably contain from about 1 to about 40 weight percent. The solutions can be made by adding the ingredients to water in any order.

The amount of the composition added to the water is a substoichiometric amount that is effective to inhibit, control, and/or remove scale and sludge and depends on the nature of the aqueous system to be treated. The phosphonic acid dosage depends to some extent on the amounts of hardness causing scale forming compounds present in the system. Generally, the amount is calculated from the calcium concentration and consequent water hardness. The copolymer dosage depends to some extent on the concentration of suspended solids and existing levels of solids buildup in the system. The composition generally is added to the aqueous system in an amount of from about 0.01 to about 500 parts per million (p.p.m.) and preferably of from about 0.1 to about 100 ppm, and especially of from about 5 to about 50 ppm.

The compositions of this invention may include or be added to water containing other ingredients customarily employed in water treatment such as alkalies, lignin derivatives, other polymers, tannins, other phosphonates, biocides, and corrosion inhibitors. In particular, for pressurized boiler water treatment, it may be convenient to add the copolymer and phosphonate in combination with a water-soluble hardness precipitating agent, typically a phosphate such as sodium phosphate, e.g., disodium phosphate or trisodium phosphate, potassium phosphate or other phosphate including polyphosphates, e.g., sodium hexametaphosphate or a fluorophosphate, or a carbonate, typically sodium carbonate. The pH in the pressurized boiler will normally be adjusted, if necessary, to about 9.5 to about 12, preferably about 10 to about 11. This pH can be achieved by maintaining the recommended alkalinity value for the particular boiler employed by adding appropriate quantities of caustic soda. This alkalinity value can be determined using well known methods, such as by titration against standard acid. Typically, the copolymer is added as an aqueous solution generally containing about 0.1 to about 50%, preferably about 2.5 to 10%, especially about 3 to about 5% by weight (active) of the copolymer. The amount of hardness precipitating agent in the solution is suitably from about 5 to about 50% (or solubility limit), preferably from about 15 to about 35%, especially about 25 to about 35%, by weight. Thus, the relative weight proportions of the copolymer and hardness precipitating agent are suitably from 0.1:50 to 10:1, preferably from 1:15 to 2:3, especially from 1:11 to 1:13. In an especially preferred method, the total amount of the copolymer, phosphonate, and precipitating agent added to the system is from about 20 to about 2500 ppm of system water.

The compositions may be introduced at any location where it will be quickly and efficiently mixed with the water of the system. The treatment chemicals are customarily added to the makeup of feed water lines through which water enters the system. Typically, an injector calibrated to deliver a predetermined amount periodically or continously to the makeup water is employed. The present invention is especially useful in the treatment of the feed or makeup water in a steam generating boiler. Such boiler systems are generally operated at a temperature of from about 298° to about 637° F. and a pressre of from about 50 to about 2,000 psig.

The composition and method of this invention are illustrated by the following examples in which all parts are by weight unless otherwise indicated.

EXAMPLES

Aqueous solutions of a composition containing equal parts of hydroxyethylidene disphosphonic acid, aminotri(methylene phosphonic acid), ethylenediaminetetra(methylene phosphonic acid), or 2-phosphonobutane tricarboxylic acid-1,2,4 and of a copolymer of allyl sulfonic acid and maleic acid having a molecular weight of about 2,000 and a allyl sulfonic acid to maleic acid mole ratio of 1:1 were prepared. The treatment solutions also contain sodium phosphate, sodium sulfate, sodium sulfite, sodium hydroxide, and sodium chloride in amounts sufficient to provide the boiler water composition shown in Table I. A solution containing the identical amounts of the treatment chemicals except for the composition of the present invention and solutions containing the identical amounts of the treatment chemicals and equivalent amounts of each component of each of the compositions were also prepared.

The sludge conditioning and scale inhibiting properties of these solutions were evaluated in a small laboratory boiler which had three removable tubes as described in the Proceedings of the Fifteenth Annual Water Conference, Engineers Society of the Western Pennsylvania, pp. 87–102 (1954). The feedwater for the laboratory boiler was prepared by diluting Lake Zurich, Ill. tap water with distilled water to 40 ppm total hardness as $CaCO_3$ and adding calcium chloride to provide a 6 to 1 element al calcium to magnesium ratio. The feedwater and chemical treatment solutions were fed to the boiler in a ratio of 3 volumes of feedwater to 1 volume of solution giving a feedwater total hardness of 30 ppm of $CaCO_3$. The scaling tests for all the treatment solutions were conducted by adjusting boiler blowdown to 10 percent of the boiler feedwater giving an approximately 10-fold concentration of the boiler water salines and adjusting the composition of the treatment solution to give a boiler water after the 10-fold concentration having the composition shown in Table I.

TABLE I

| | |
|---|---|
| Sodium Hydroxide as NaOH | 258 ppm |

TABLE I-continued

| | |
|---|---|
| Sodium Carbonate as $Na_2CO_3$ | 120 ppm |
| Sodium Chloride as NaCl | 681 ppm |
| Sodium Sulfite as $Na_2SO_3$ | 50 ppm |
| Sodium Sulfate as $Na_2SO_4$ | 819 ppm |
| Silica as $SiO_2$ | less than 1 ppm |
| Iron as Fe | less than 1 ppm |
| Phosphate as $PO_4$ | 10–20 ppm |

The scaling tests were run for 45 hours each at a boiler water pressure of 400 psig. At the completion of a test, the boiler tubes were individually removed from the boiler and the scale or deposit present on 6 inches of the central length of each tube was removed by scraping, collected in a tared vial, and weighed. The results of the tests are shown in Table II.

TABLE II

| Run No. | Additive(s) | Additive Dosage in the Boiler Water (ppm) | Scaling Rate (g/ft²/hr) | Scale Reduction (%) |
|---|---|---|---|---|
| | Comparative Runs | | | |
| 1 | None (Blank) | — | 0.213 | — |
| 2 | Allyl sulfonic acid and maleic acid copolymer (1:1, weight average molecular weight of about 2,000) (I) | 5 | 0.063 | 70.4 |
| 3 | Hydroxyethylidene diphosphonic acid (II) | 5 | 0.148 | 30.5 |
| 4 | Aminotri(methylene phosphonic acid) (III) | 5 | 0.105 | 50.7 |
| 5 | Ethylenediaminetetra(methylene phosphonic acid) (IV) | 5 | 0.143 | 32.9 |
| 6 | 2-Phosphonobutane tricarboxylic acid 1,2,4 (V) | 5 | 0.167 | 21.6 |
| | Examples | | | |
| 1 | I + II (1:1 active) | 5 | 0.007 | 96.7 |
| 2 | I + III (1:1 active) | 5 | 0.005 | 97.7 |
| 3 | I + IV (1:1 active) | 5 | 0.010 | 95.3 |
| 4 | I + V (1:1 active) | 5 | 0.010 | 95.3 |

The comparative results on scale formation shown in Table II demonstrate that the composition and method of the present invention provide scale inhibition that unexpectedly is very considerably superior to that of the components added alone.

In a second series of tests, the system used in Examples 1–4 was first run for 45 hours without any addition of copolymer and then one of the three tubes was taken out and replaced by a clean tube. The system was then run for a further 45 hours but this time with a copolymer of sodium vinyl sulfonate and maleic acid added. After this further period of 45 hours, the scale in the three tubes was weighed as before. Thus, comparison of the results of this test with those of an untreated blank (no polymer added during the second 45 hour period) enables one to assess whether the polymer was capable of removing scale and also preventing the formation of scale on a clean tube. The results obtained are shown in the following Table III.

TABLE III

| Example | Additives | Active Dosage in the Boiler Water, (ppm) | Scale Reduction (%) |
|---|---|---|---|
| Comparative | II | 30 | 77.8 |
| 5 | I + II (1:1 active) | 30 | 115.1 |
| 6 | VI + II (1:1 active) | 30 | 110.1 |

VI = copolymer of sodium vinyl sulfonate and maleic acid (1.5:1; weight average molecular weight of about 7,000-9,000).

It can be seen that, in Examples 5 and 6 where the combination of phosphonate and vinyl or allyl copolymer was used, the scale reduction was greater than 100%, thus indicating the removal of existing scale.

We claim:

1. A composition for controlling scale in an aqueous steam generating boiler system comprising scale inhibiting amounts of a mixture consisting essentially of:
   (1) a copolymer of maleic acid and allyl sulfonic acid or a water soluble salt thereof, said copolymer having a molecular weight of from about 800 to about 25,000 and an allyl sulfonic acid to maleic acid mole ratio of about 1:3 to 3:1;
   (2) from about 0.25 to about 4 parts by weight, per part by weight of said copolymer or copolymer salt, of hydroxyethylidene-1,1-diphosphonic acid or a water soluble salt thereof; and
   (3) from about 500 to about 0.1 parts by weight, per part by weight of said copolymer or copolymer salt, of a water soluble sodium phosphate hardness precipitating agent.

2. Composition as defined in claim 1 containing from about 15 to about 1.5 parts of sodium phosphate hardness precipitating agent per part by weight of copolymer or copolymer salt.

3. Composition as defined in claim 2 in which the weight ratio of (1) and (2) is about 1:1.

4. Composition as defined in claim 3 in which the allyl sulfonic acid to maleic acid ratio is about 1:1.

5. Composition as defined in claim 4 in which the copolymer has a molecular weight of about 1,000 to 15,000.

6. Composition as defined in claim 1 comprising an aqueous solution of (1), (2) and (3).

* * * * *